United States Patent [19]

Hillis et al.

[11] Patent Number: 4,773,038

[45] Date of Patent: Sep. 20, 1988

[54] METHOD OF SIMULATING ADDITIONAL PROCESSORS IN A SIMD PARALLEL PROCESSOR ARRAY

[75] Inventors: W. Daniel Hillis, Cambridge; Clifford Lasser, Boston; Brewster Kahle; Karl Sims, both of Somerville, all of Mass.

[73] Assignee: Thinking Machines Corporation, Cambridge, Mass.

[21] Appl. No.: 832,913

[22] Filed: Feb. 24, 1986

[51] Int. Cl.$^4$ .............................................. G06F 9/00
[52] U.S. Cl. ......................................................... 364/900
[58] Field of Search ................................. 364/200, 900

[56] References Cited

U.S. PATENT DOCUMENTS

| | | | |
|---|---|---|---|
| 3,573,852 | 4/1971 | Watson | 364/200 |
| 4,380,046 | 4/1983 | Frosch | 364/200 |
| 4,523,273 | 6/1985 | Adams, III et al. | 364/200 |
| 4,539,655 | 9/1985 | Trussell et al. | 364/900 |
| 4,546,433 | 10/1985 | Tucker | 364/200 |
| 4,621,339 | 11/1986 | Wagner et al. | 364/900 |

OTHER PUBLICATIONS

IEEE Computer Society Workshop on Computer Architecture for Pattern Analysis and Image Database Management, Hot Springs, Va., Nov. 11th–13th, 1981, pp. 201–208, IEEE, New York, U.S.; S. L. Tanimoto et al.: "An Image Processor Based on an Array of Pipelines".

*Primary Examiner*—Gareth D. Shaw
*Assistant Examiner*—John G. Mills, III
*Attorney, Agent, or Firm*—Pennie & Edmonds

[57] ABSTRACT

A method is described for simulating additional processors in a SIMD computer by dividing the memory associated with each processor into a plurality of sub-memories and then operating on each sub-memory in succession as if it were associated with a separate processor. Thus, a first instruction or set of instructions is applied to all the processors of the array to cause at least some processors to process data stored at a first location or locations in the first sub-memory. Thereafter, the same first instruction or set of instructions is applied to all the processors of the array to cause at least some processors to process data stored at the same first location in a second sub-memory. And so forth for each of the sub-memories. By operating a SIMD computer in this fashion, it is possible in effect to vary the number of processors in the array so as to provide the number of processors required for a problem.

3 Claims, 3 Drawing Sheets

METHOD OF SIMULATING ADDITIONAL PROCESSORS IN A SIMD PARALLEL PROCESSOR ARRAY

CROSS REFERENCE TO RELATED PATENTS AND PATENT APPLICATIONS

Related patents are U.S. Pat. No. 4,598,400 for "Method and Apparatus for Routing Message Packets" and 4,709,327 for "Parallel Processor/Memory Circuit".

Related applications are "Parallel Processor", Ser. No. 499,474 filed May 31, 1983, "Method and Apparatus for Interconnecting Processors in a Hyper-Dimensional Array", Ser. No. 740,943, filed May 31, 1985, and "Method and Apparatus for Simulating Systems Described by Partial Differential Equations", filed Dec. 27, 1985. All of these patents and patent applications are incorporated herein by reference.

BACKGROUND OF THE INVENTION

This relates to a method of simulating additional processors in a single-instruction multiple-data (SIMD) parallel processor array.

In a SIMD computer a large number of processors work in parallel on a computing problem. In the Connection Machine (Reg. T.M.) Computer a SIMD array of over 32,000 processor/memories are connected in parallel. While the availability of this many processor/memories represents a significant advance over the art, there still is a need for arrays of even more processor/memories. For example, it would be helpful in generating displays to be able to provide a processor/memory for each data point or pixel in the display. To provide a high resolution display of $1000 \times 1000$ pixels with such capability, it is necessary to provide 1,000,000 processor/memories. Similar numbers are likely to be needed for devices which simulate vision and other devices of interest to artificial intelligence studies. Other applications such as the simulations of fluid media described in "Method and Apparatus for Simulating Systems Described by Partial Differential Equations" also need enormous numbers of processor/memories if use of these inventions is to be practical.

SUMMARY OF THE INVENTION

We have discovered that additional processors can be simulated in a SIMD computer by dividing the memory associated with each processor into a plurality of sub-memories and then operating on each sub-memory in succession as if it were associated with a separate processor. Thus, a first instruction or set of instructions is applied to all the processors of the array to cause at least some processors to process data stored at a first location or locations in the first sub-memory. Thereafter, the same first instruction or set of instructions is applied to all the processors of the array to cause at least some processors to process data stored at the same first location in a second sub-memory. And so forth for each of the sub-memories.

By operating a SIMD computer in this fashion, it is possible in effect to vary the number of processors in the array so as to provide the number of processors required for a problem. This permits programs that require large numbers of processors to run on computers that do not have that many physical processors. It makes it possible to perform computational problems such as those associated with the generation of a display with greater resolution than would otherwise be possible. In the case of the simulation of systems described by partial differential equations, the technique of the present invention makes it possible to compute data for over 4,000,000 points in an array using only 32,768 processors.

BRIEF DESCRIPTION OF THE DRAWINGS

These and other objects, features and advantages of our invention will be more readily apparent from the following detailed description of a preferred embodiment of the invention in which.

DETAILED DESCRIPTION OF THE PREFERRED EMBODIMENT

The present invention is intended to be implemented in a single instruction multiple data (SIMD) computer such as the Connection Machine Computer described in detail in U.S. Pat. No. 4,598,400.

Figure 1:
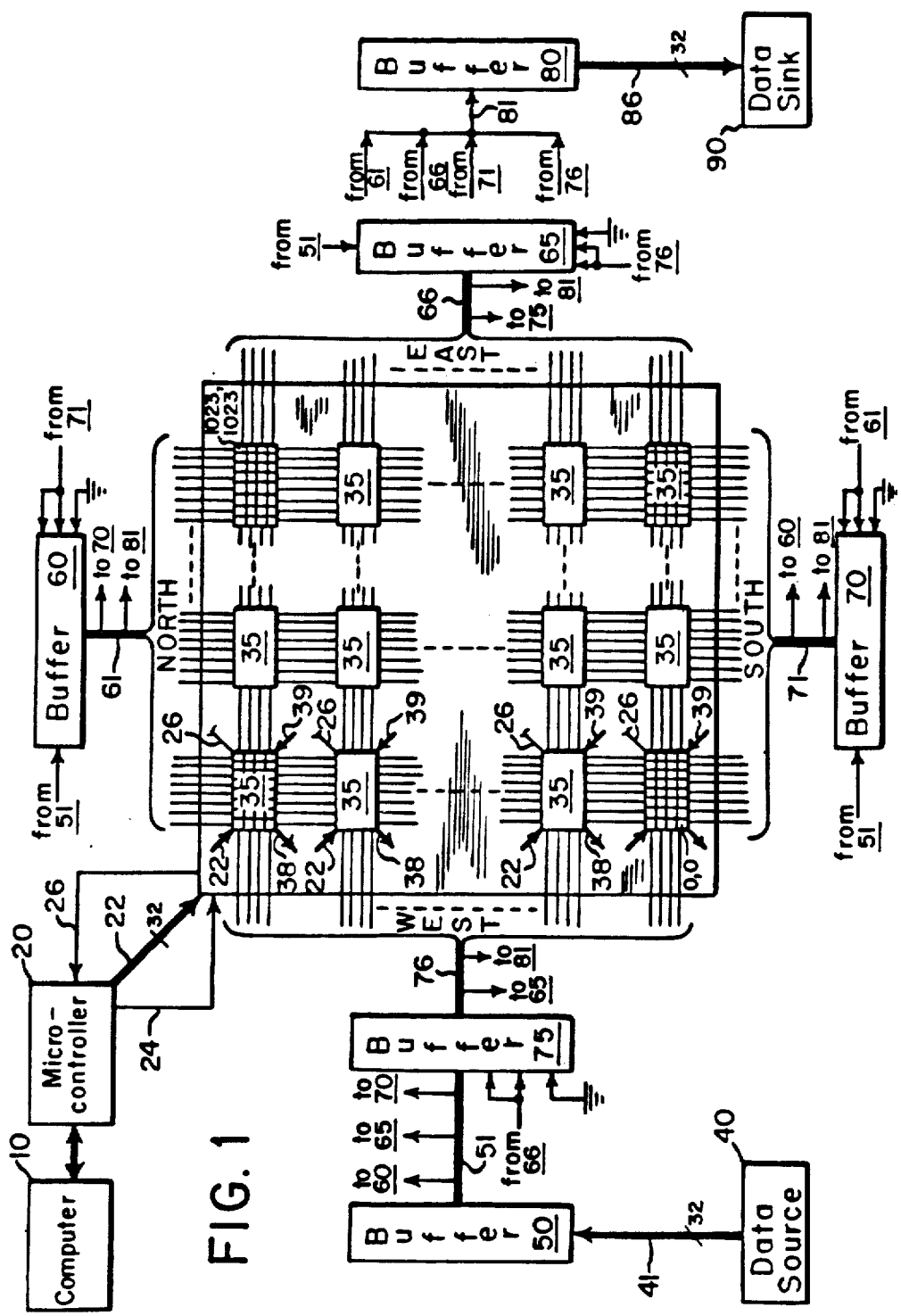
FIGS. 1 and 2 depict in schematic form details of a SIMD processor preferably used in the practice of the invention.

As shown in FIG. 1A of that patent which is reproduced in FIG. 1, the computer system comprises a mainframe computer 10, a microcontroller 20, an array 30 of parallel processing integrated circuits 35, a data source 40, a first buffer and multiplexer/demultiplexer 50, first, second, third and fourth bidirectional bus control circuits 60, 65, 70, 75, a second buffer and multiplexer/demultiplexer 80, and a data sink 90. Mainframe computer 10 may be a suitably programmed commercially available general purpose computer such as a VAX (TM) computer manufactured by Digital Equipment Corp. Microcontroller 20 is an instruction sequencer of conventional design for generating a sequence of instructions that are applied to array 30 by means of a thirty-two bit parallel bus 22. Microcontroller 20 receives from array 30 a signal on line 26. This signal is a general purpose or GLOBAL signal that can be used for data output and status information. Bus 22 and line 26 are connected in parallel to each IC 35. As a result, signals from microcontroller 20 are applied simultaneously to each IC 35 in array 30 and the signal applied to microcontroller 20 on line 26 is formed by combining the signal outputs from all of ICs 35 of the array.

In the embodiment of the Connection Machine Computer used in the practice of the present invention, array 30 contains 4096 ($=2^{11}$) identical ICs 35; and each IC 35 contains 16 ($=2^4$) identical processor/memories 36. Thus, the entire array 30 contains 65,536 ($=2^{15}$) identical processor/memories 36.

Processor/memories 36 are organized and interconnected in two geometries. One is a conventional two-dimensional grid pattern in which the processor/memories are organized in a rectangular array of $128 \times 512$ processor/memories and connected to their four nearest neighbors in the array. The other is a Boolean-cube of fifteen dimensions.

To connect each processor/memory to its four nearest neighbors, the individual processor/memories are connected by electrical conductors between adjacent processor/memories in each row and each column of the grid as shown in FIGS. 6A and 7A of the '400 patent; and the four nearest neighbors of an IC except those on the edges of the array will be recognized to be the four ICs immediately adjacent that IC on the North, East, South and West.

Connections to the fifteen nearest neighbors of each processor/memory in the Boolean-cube are made by means of electrical conductors and routers. Details of the wiring scheme are set forth in the '943 application referenced above. Details of the router are set forth in the '400 patent.

Figure 2:
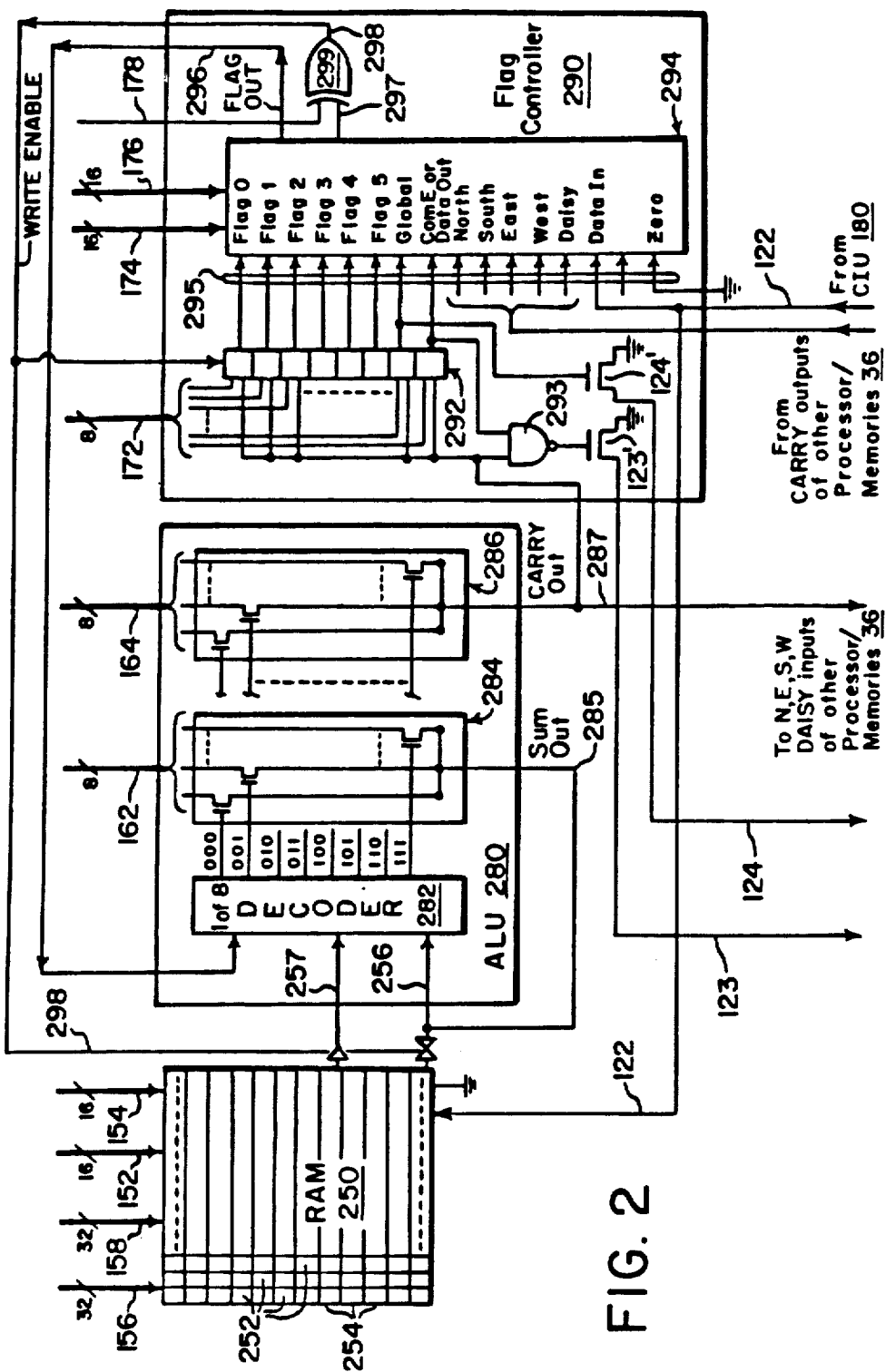

An illustrative processor/memory 36 is disclosed in greater detail in FIG. 2 which is the same as FIG. 7A of the '400 patent. As shown in FIG. 2, the processor/memory comprises random access memory (RAM) 250, arithmetic logic unit (ALU) 280 and flag controller 290. The ALU operates on data from three sources, two registers in the RAM and one flag input, and produces two outputs, a sum output that is written into one of the RAM registers and a carry output that is made available to certain registers in the flag controller as well as to certain other processor/memories.

The inputs to RAM 250 are busses 152, 154, 156, 158, a sum output line 285 from ALU 270, the message packet input line 122 from communication interface unit (CIU) 180 of FIG. 6B of the '400 patent and a WRITE ENABLE line 298 from flag controller 290. The outputs from RAM 250 are lines 256, 257. The signals on lines 256, 257 are obtained from the same column of two different registers in RAM 250, one of which is designed Register A and the other Register B. Busses 152, 154, 156, 158 address these registers and the columns therein in accordance with the instruction words from microcontroller 20. Illustratively, RAM 250 has a memory capacity of 4096 bits.

Flag controller 290 is an array of eight one-bit D-type flip-flops 292, a two-out-of-sixteen selector 294 and some logic gates. The inputs to flip-flops 292 are a carry output signal from ALU 280, a WRITE ENABLE signal on line 298 from selector 294, and the eight lines of bus 172 from programmable logic array (PLA) 150 of FIG. 6B of the '474 application. Lines 172 are address lines each of which is connected to a different one of flip-flops 292 to select the one flip-flop into which a flag bit is to be written. The outputs of flip-flops 292 are applied to selector 294.

The inputs to selector 294 are up to sixteen flag signal lines 295, eight of which are from flip-flops 292, and the sixteen lines each of busses 174, 176. Again, lines 174 and 176 are address lines which select one of the flag signal lines for output or further processing. Selector 294 provides outputs on lines 296 and 297 that are whichever flags have been selected by address lines 174 and 176, respectively. The flags are defined in detail in Table IV of the '400 patent.

ALU 280 comprises a one-out-of-eight decoder 282, a sum output selector 284 and a carry output selector 286. As detailed in the '400 patent, this enables it to produce sum and carry outputs for many functions including ADD, logical OR and logical AND. ALU 280 operates on three bits at a time, two on lines 256, 257 from Registers A and B in RAM 250 and one on line 296 from flag controller 290. The ALU has two outputs: a sum on line 285 that is written into Register A of RAM 250 and a carry on line 287 that may be written into a flag register 292 and applied to the North, East, South, West and DAISY inputs of the other processor/memories 36 to which this processor/memory is connected.

In accordance with the present invention, each processor/memory can be divided into several units that function identically. In effect, each unit operates as a separate processor/memory sharing the RAM, ALU and flag controller of one physical processor/memory. The number of such units that can be implemented in one physical processor/memory depends on the memory requirements for each unit.

Figure 3:
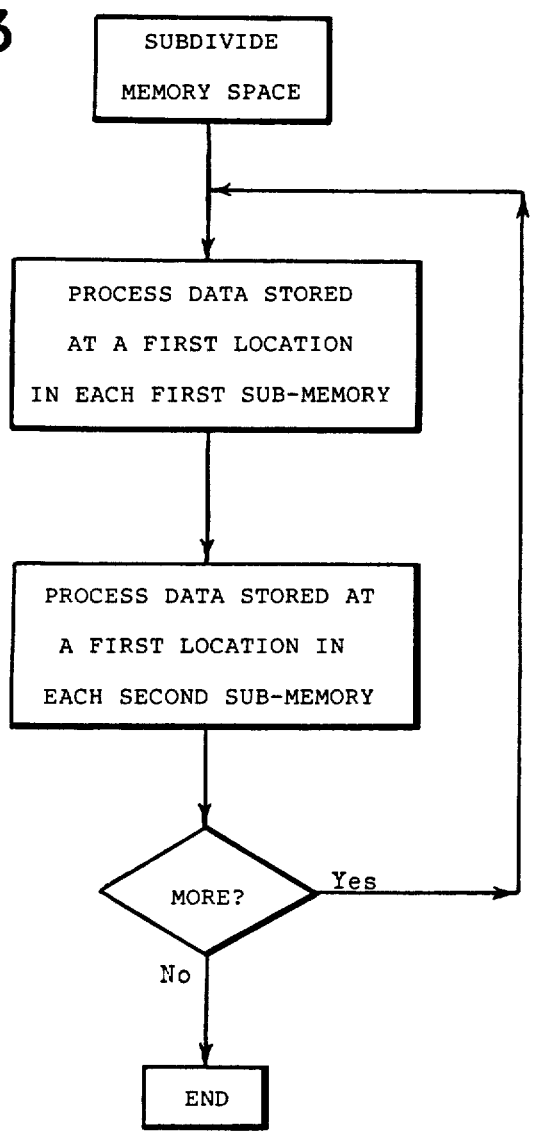
FIG. 3 is a flow chart illustrating the practice of the invention.

The subdivision of one physical processor/memory into several is accomplished by partitioning the memory in each physical processor/memory in the same fashion and providing in microcontroller 20 of FIG. 1 the capacity of having each physical processor memory operate first on one portion of the partitioned memory, then on the next portion of the partitioned memory and so on through each subdivision of the memory. A flow chart illustrating this process is set forth in FIG. 3.

Subdivision of the memory is readily accomplished. For example, in the present design of the Connection Machine Computer, each RAM 250 contains 4096 bits or 512 bytes of eight bits each. Illustratively, each byte has a separate memory location or address from 000 through 511. To subdivide the memory into four sub-memories, memory locations 000 through 127 are assigned to first sub-memory, memory locations 128 through 255 to a second sub-memory, memory locations 256 through 383 to a third sub-memory, and memory locations 384 through 511 to a fourth sub-memory. The memory can be divided into smaller sub-divisions if desired.

The same memory location in each sub-memory relative to the first memory location is used exactly the same way in each sub-memory. Thus, if data specifying the degrees, minutes and seconds of an angle are stored in first, second and third memory locations 000, 001, and 002 of the first sub-memory, data specifying the degrees, minutes and seconds of an angle are also stored in first, second and third memory locations 128, 129, 130 of the second sub-memory, in first, second and third memory locations 256, 257, 258 of the third sub-memory, and in first second and third memory locations 384, 385, 386 of the fourth sub-memory.

The sequence of operations performed on each portion of the partitioned memory is the same whether it involves a single operation or several. The capability of advancing from one portion of the partitioned memory to the next portion may be achieved in different ways. For example, all addressing in the programs specified by the controller can be relative with respect to the first memory address of each subdivided unit of memory. Alternatively, the memory addresses used in the program may be specified in relative terms in the program and then these addresses may be incremented when advancing from one portion of the partitioned memory to the next.

As will be apparent to those skilled in the art, numerous modifications may be made within the scope of the above described invention.

What is claimed is:

1. In a single-instruction multiple-data (SIMD) parallel processor comprising a controller and an array of processors controlled in parallel by said controller, each processor comprising an identical input, an identical output, an identical processing element and an identical memory associated with each processing element, the processing element operating in accordance with instructions provided by said controller on data provided by its input and associated memory to produce data at its output, a method of simulating the presence of additional processors in the array comprising the steps of:

(a) subdividing the memory associated with the processing elements in identical fashion to form a plurality of submemories associated with each processing memory whereby each memory is divided into at least first and second submemories, the first submemories of all the processing elements comprising a first memory group and the second submemories of all the processing elements comprising a second memory group, (b) providing to each memory group in turn a first identical sequence of instructions by:
  (1) providing instructions from the controller to the processors to cause the processing elements of at least some processors each to process data stored at first memory locations in a first submemory associated with the processing element, and
  (2) at a subsequent time, providing the same instructions from the controller to the processors to cause the processing elements of at least some processors each to process data stored at second memory locations in a second submemory associated with the processor, said first and second memory locations in said first and second submemories having the same relative location in their respective submemories, and (c) providing to each memory group in turn a second identical sequence of instructions, which may be the same as or different from the first identical sequence of instructions, by:
  (1) providing instructions from the controller to the processors to cause the processing elements of at least some processors each to process data stored at third memory locations in said first submemory associated with the processing element, and
  (2) at a subsequent time, providing the same instructions from the controller to the processors to cause the processing elements of at least some processors each to process data stored at fourth memory locations in said second submemory associated with the processor, said third and fourth memory locations in said first and second submemories having the same relative location in their respective submemories and wherein said third and fourth memory locations may be the same as or different from said first and second memory locations, respectively.

2. The method of claim 1 further comprising the steps of performing steps (c) (1) and (2) on new data stored at the same memory locations in the first and second submemories.

3. The method of claim 1 further comprising the steps of repeating steps (b) (1) and (2) and (c) (1) and (2) on data stored at additional memory locations in the first and second submemories.

* * * * *